INVENTOR.
DANIEL J. SWEENEY
BY Robert L. Spencer
ATTORNEY

INVENTOR.
DANIEL J. SWEENEY
BY Robert L. Spencer
ATTORNEY

Feb. 27, 1951 D. J. SWEENEY 2,543,136

TELEVISION APPARATUS

Filed May 8, 1947 3 Sheets-Sheet 3

INVENTOR.
DANIEL J. SWEENEY
BY
Robert L. Spencer
ATTORNEY

Patented Feb. 27, 1951

2,543,136

UNITED STATES PATENT OFFICE 2,543,136

TELEVISION APPARATUS

Daniel J. Sweeney, Cleves, Ohio, assignor to Avco Manufacturing Corporation, Cincinnati, Ohio, a corporation of Ohio Application May 8, 1947, Serial No. 746,735

22 Claims. (Cl. 312—7)

This invention relates to television apparatus and more particularly to a novel cabinet construction in which the picture reproducing device may be disposed within and concealed by the cabinet and is movable to a viewing position. By this invention there is provided a television cabinet having a television receiver or part thereof supported within a pivotally mounted housing which is adapted and arranged to be movable into a plurality of viewing positions and to coincide with the front wall of the cabinet to provide a substantially smooth unbroken contour when the housing is pivoted to an inoperative position.

An object of this invention is to provide a television cabinet having a novel means whereby a picture tube may be positioned in a plurality of viewing positions.

Another object of this invention is to provide a television cabinet having an opening in the front wall thereof and having a picture tube supported within a pivotally mounted housing, whereby the housing may selectively be placed in a plurality of angular positions with respect to the front wall of the cabinet for viewing purposes and whereby the housing may also be positioned to close the opening in the cabinet to provide a cabinet of substantially smooth unbroken contour.

A further object of this invention is to provide, in a television receiver cabinet, a novel mount whereby a picture tube of greater length than the depth of the cabinet may be supported for pivotal movement between an inoperative position in which a side wall of the mount coincides with the plane of the front wall of the cabinet, and a plurality of operative positions wherein the mount extends outwardly through an opening in the front wall of the cabinet.

A still further object of this invention is to provide a television cabinet having an opening in the front wall thereof and a picture tube housing pivotally mounted within the opening and adapted to close the opening when placed in an inoperative position together with a novel means responsive to movement of the housing for automatically closing the space between the housing and each edge of the opening in which the housing is pivoted in order to close the opening and maintain a pleasing appearance, irrespective of the angular position of the housing with respect to the front of the cabinet.

The novel features that I consider characteristic of my invention are set forth in the appended claims. The invention, itself, however, both as to its organization and method of operation, together with additional objects and advantages thereof, will be best understood from the following description of a specific embodiment when read in conjunction with the accompanying drawings in which—

Figure 1:
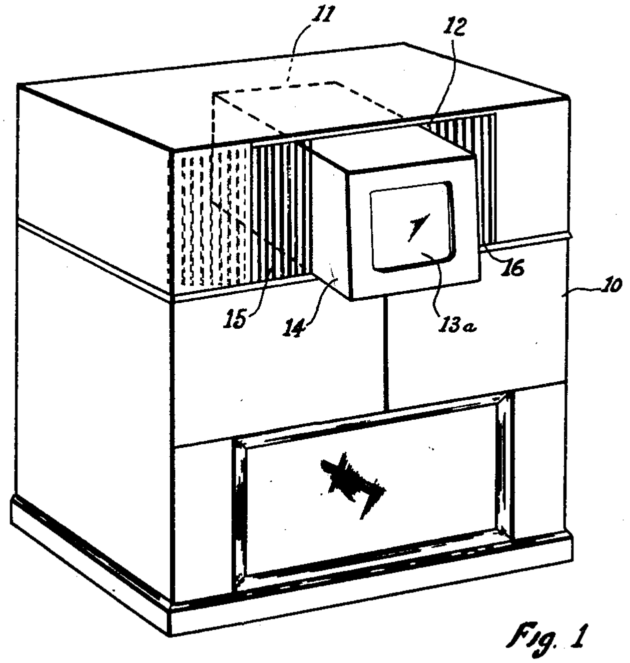
Fig. 1 is a perspective view of a novel television cabinet arrangement constructed in accordance with the principles of this invention, showing the picture tube mount in an operative position and positioned to permit viewing of the image screen from a desired angular point of observation with respect to the front of the cabinet.
Figure 2:
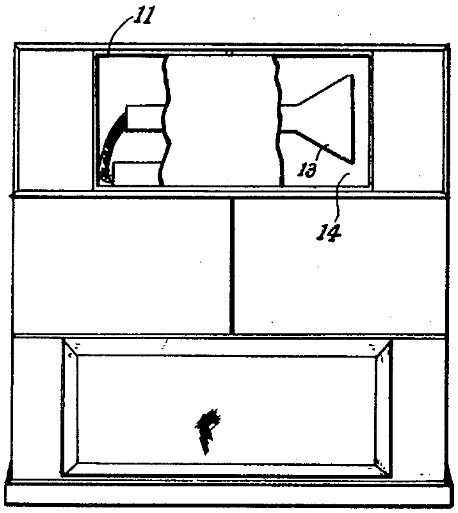
Fig. 2 is a front view, with parts broken away, showing the picture tube housing rotated to an inoperative position.
Figure 3:
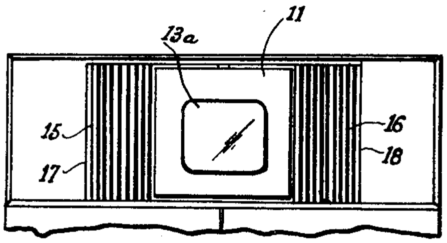
Fig. 3 is a front view of the upper portion of a television cabinet showing the picture tube housing positioned for viewing from a location directly in front of the cabinet.

Referring to Figs. 1 through 3, there is shown a television cabinet 10 having a pivotally mounted picture tube housing 11 positioned in the upper portion of the cabinet. An opening 12 is provided in the front wall of the cabinet to accommodate the housing which is of a greater length than the depth of the cabinet. The picture tube, which preferably consists of a standard cathode ray tube 13 is positioned within housing 11 with the longitudinal axis of the tube parallel to the longitudinal axis of the housing. Tube 13, may, of course, be a cathode ray tube having an angular bend intermediate the two ends thereof. In such case, it would only be necessary to position the tube within the housing in such manner that the picture screen of the tube is adjacent a window 13a provided in one end of the housing.

The width of the opening 12, as shown, is substantially the same as, but slightly greater than, the length of the housing. In like manner, the height of opening 12 is approximately the same, but slightly greater than, the height of the picture tube housing. Tube 13 may be supported within the housing in any suitable manner as by means of clamps (not shown). Housing 11 is pivotally mounted within the cabinet and is adapted to extend through opening 12 upon rotation about its pivotal axis to a convenient position for viewing the screen of the picture tube.

Figures 5, 6:
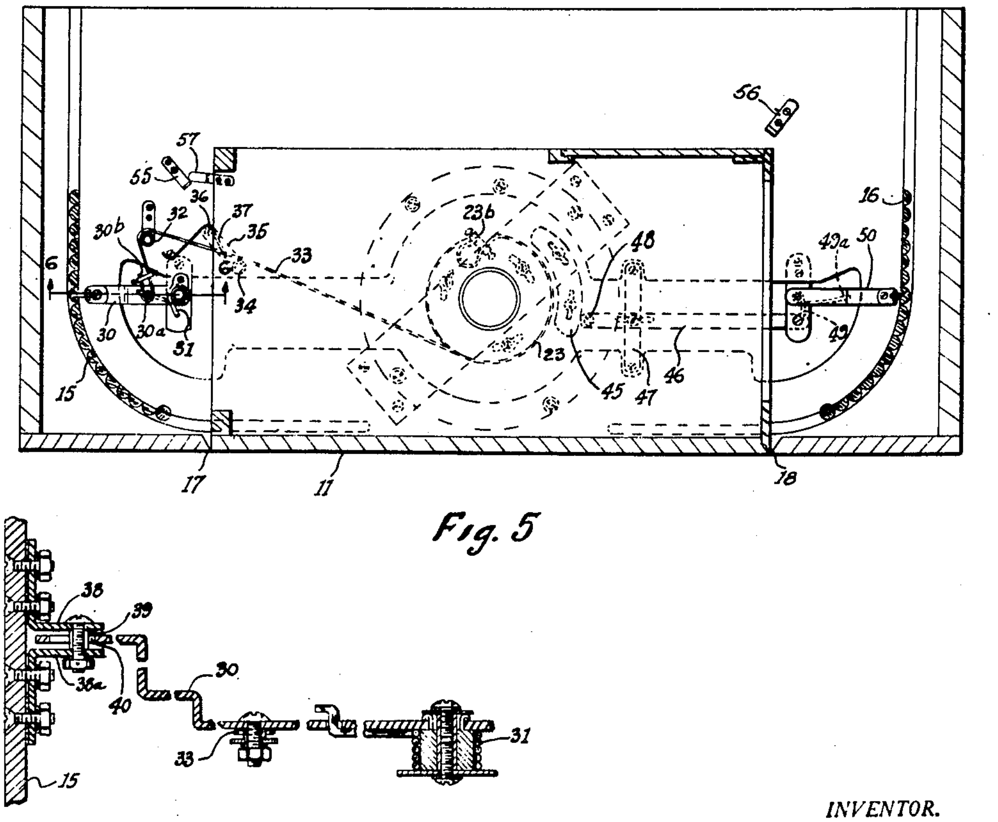
Fig. 5 is a partially sectional view taken along the lines 5—5 of Fig. 4.
Fig. 6 is an enlarged sectional view taken along the line 6—6 of Fig. 5, illustrating in detail an operating means for actuating a tambour slide in response to rotation of the picture tube housing.
Figure 7:
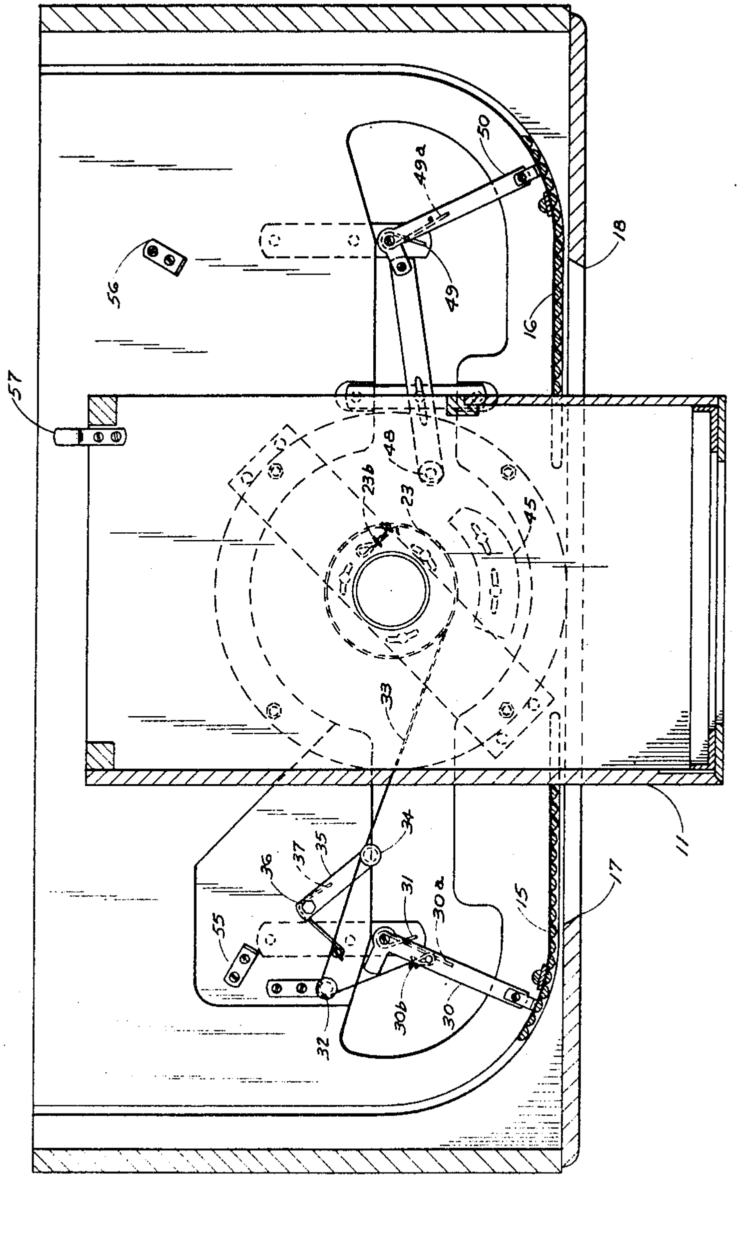
Fig. 7 is a partially sectional view showing the housing in the position shown in Fig. 3, and taken along the direction of Fig. 5.

As illustrated in Figs. 2 and 5, the vertical pivotal axis about which housing 11 is rotated is so chosen that one of the side walls 14 of the housing will coincide with and lie in the plane of the front of the cabinet, thereby completely closing opening 12 upon rotation of the housing to a closed position in which window 13*a* is moved within the cabinet. Upon closing of housing 11, both the longitudinal axis of the housing and the picture tube will extend parallel to the front wall of the cabinet.

In order to provide a structure pleasing to the eye irrespective of the angular position of the housing with respect to the front wall of the cabinet, a suitable means such as a pair of tambour slides 15 and 16 which are actuated in response to pivotal movement of housing 11 are provided. Slides 15 and 16, it will readily be understood, function to close the space between the side walls 14 of housing 11 and edges 17 and 18 of opening 12 whenever the housing is placed in a position for viewing the screen of the picture tube. The slides are actuated in response to rotation of housing 11 as hereafter explained.

Figure 4:
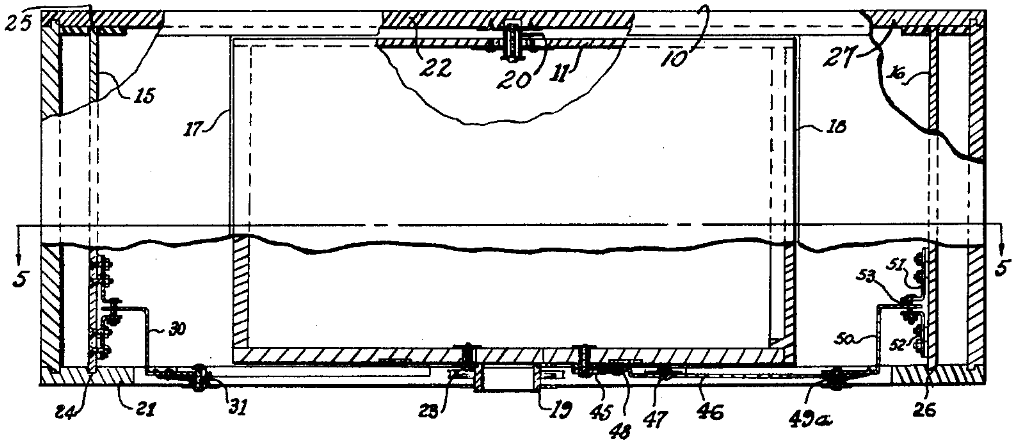
Fig. 4 is an enlarged, partially sectional view of Fig. 2 illustrating the slide mechanism and picture box arrangement in the cabinet.

In Fig. 4 there is shown partially in section one embodiment of the invention illustrating the pivotal mounting of the housing 11 together with means for actuating tambour slides 15 and 16 in response to movement of the housing about its vertical pivotal axis. As shown, housing 11 is mounted within cabinet 10 by means of suitable pivots 19 and 20 which cooperate with a cabinet shelf 21, and the upper wall 22 of the cabinet, respectively, to pivotally support the housing. Pivot 19, which is rotatably mounted in an opening in shelf 21, carries a drive pulley 23 for a purpose hereafter more fully explained. Slide members 15 and 16 are slidably mounted in suitable guides, such as grooves 24, 25, 26 and 27, provided in the cabinet shelf 21 and upper wall 22 of the cabinet. As shown in Figs. 4 and 5, the slide members are withdrawn to a fully retracted position upon rotation of housing 11 to its inoperative closed position in which the side wall of the housing coincides with the plane of the front wall of the cabinet.

Referring to Figs. 4, 5 and 6, suitable means responsive to pivotal movement of housing 11 for automatically retracting the slide members within the guides provided therefor are shown. Slide member 15 is actuated by means of an assembly consisting of a slide arm 30 pivotally mounted to shelf 21, and spring loaded by spring 31. It will readily be understood that spring 31, which is preferably a preloaded spring, normally tends to urge the slide arm 30 together with slide member 15 outwardly so that the outer end of the slide member will maintain itself in abutment with a side wall of housing 11. Means for retracting the slide member 15 in response to rotation of housing 11 includes drive pulley 23 which is fixedly secured to the bottom of housing 11, an idler pulley 32 which is mounted upon the shelf of the cabinet, a cable take-up pulley 34, and a cable 33 operatively connecting an intermediate point of slide arm 30, pulley 32, pulley 34 and drive pulley 23. One end of cable 33 is fixedly secured to slide arm 30 by means of a bearing sleeve 30*a* and a cable clamp 30*b*, while the other end of the cable is wound around drive pulley 23, is fastened to the pulley by means of a cable clamp 23*b*. Pulley 34 is rotatably mounted on a cable take-up bracket 35, which in turn is pivotally mounted upon the shelf of the cabinet by means of a suitable stud 36. A suitable spring 37 is provided to spring load the arm 35 so that the assembly automatically takes up any slack which may occur in cable 33 when housing 11 is moved to a viewing position. As shown in Fig. 6, slide arm 30 is operatively connected to the tambour slide 15 by means of a pair of similar slide brackets 38, and 38*a*, together with a slide bracket sleeve 39 which extends through an opening 40 in arm 30 to provide a pivotal connection between the arm and the brackets.

Further referring to Figs. 4, 5 and 6, there is shown a suitable means for actuating slide member 16 in response to pivotal movement of housing 11. As shown, a cam 45 is fixedly secured to the bottom of housing 11 and moves upon rotation of the housing about its pivotal axis. A cam lever 46 is slidably mounted on shelf 21 by means of a cam lever bracket 47 fastened to shelf 21. One end of the cam lever 46 is provided with a suitable roller 48 for cooperation with cam 45, while the other end of the cam lever is operatively connected to one end of a bell crank lever 49 which is pivotally mounted upon shelf 21. The opposite end of the bell crank lever is in turn operatively connected to a slide arm 50 which cooperates with a pair of similar slide brackets 51 and 52 and a sleeve 53, similar to those shown and described in connection with Fig. 6, to provide a pivotal connection between tambour slide 16 and slide arm 50. Slide arm 50 is spring loaded by means of a suitable spring 49*a* so that the arm normally tends to urge the slide member 16 outwardly from a retracted position into abutting contact with a side wall of housing 11. A pair of stops 55 and 56 cooperate with a stop member 57 to limit the permissible range of rotary movement of member 11 about its pivotal axis.

In the embodiment illustrated, housing 11 is permitted to rotate through an angle of one hundred twenty (120°) degrees from a fully closed to fully open position. Stops 56 and 57 are so arranged that sixty degrees (60°) of the one hundred twenty (120°) degrees represents the viewing angle. Thus, the television screen or window 13*a* may be directly viewed from any angle between zero and thirty degrees (0°–30°) from either the right or left of the direct front view of the cabinet.

When the television set is not in use the picture tube housing 11 is normally rotated about its pivotal axis and maintained in a closed position such that one side wall of the housing is flush with and coincides with the front wall of the cabinet, thereby providing a television receiver cabinet which presents a closed front of substantially smooth unbroken contour which is pleasing to the eye. In order to view the screen of picture tube 13, housing 11 is rotated in a clockwise direction to any desirable position for viewing. Rotation is accomplished by simply pressing against the side of housing 11 and turning on its axis. The slide arms 30 and 50 are each normally spring loaded and tend to urge the tambour slides 15 and 16 outwardly into contact with the side walls of housing 11. Upon such clockwise rotation of housing 11, tambour slide 15 will be permitted, without any substantial time delay, to slide outwardly into contact with one side wall of housing 11. Tambour slide 16 on the other hand is retained in its retracted position by means of cam 45 until the interior side wall of the housing is adjacent with the edge 18 of the opening in the front wall of the cabinet. The cam member 45 will thereafter permit spring 49a to urge the tambour slide 16 outwardly into contact with the side wall of the housing. It will of course be readily understood that pulley 34 through the action of spring 37 will automatically take up any slack in cable 33 which may occur upon clockwise rotation of the housing. Upon counterclockwise rotation of housing 11 tambour slide 16 will be immediately withdrawn to its retracted position while a slight time delay will occur before tambour slide 15 is completely withdrawn. That is to say, the spring loaded arm 35 on which idler pulley 34 is mounted will rotate about its pivot 36 against the tension of spring 37, providing a time delay before cable 33 exerts a sufficient tension on arm 30 to cause the arm to retract.

It will be seen that the invention provides a novel arrangement for mounting a television picture tube which is of greater length than the depth of the cabinet and which may be moved from an inoperative position to any desirable angle with respect to the front wall of the cabinet without extending outwardly from the rear of the cabinet, irrespective of such position. Likewise, upon rotation of housing 11 to a closed position, one wall of the housing, which has substantially the same dimensions as that of the opening in the wall of the cabinet, coincides with the front wall of the cabinet thereby presenting a cabinet of substantially smooth unbroken contour. Similarly, when the housing is positioned in any angle with respect to the front wall of the cabinet for viewing purposes, a means is provided for automatically closing off the space between the side walls of the housing and the edges of the opening in the front wall of the cabinet in order to present a structure pleasing to the eye, irrespective of the angular rotation of the housing with respect to the cabinet.

While a particular embodiment of my invention has been disclosed and described, it is to be understood that various changes and modifications may be made as will readily be apparent to a person skilled in the art without departing from the spirit or scope of this invention. Having described my invention, I claim:

1. In a cabinet having a pivotally mounted housing adapted to selectively extend through or close an opening in a wall of said cabinet, closure means adapted to assume an extended position for closing off said opening upon rotation of said housing therethrough, means for urging said closure means toward said housing, and means responsive to rotation of said housing for retracting said closure means within said cabinet.

2. In a cabinet having a pivotally mounted housing adapted to selectively extend through or close an opening in a wall of said cabinet, closure means adapted to extend substantially parallel to the plane of said opening and to be withdrawn from said opening, means for urging said closure means toward said housing to close off said opening when said housing is extended therethrough, and means responsive to rotation of said housing for retracting said closure means within said cabinet.

3. In a cabinet having a pivotally mounted housing adapted to selectively extend through or close an opening in a wall of said cabinet, closure means movably mounted in said cabinet adapted to assume an extended position for closing off said opening upon rotation of said housing therethrough, spring means for urging said closure means toward said housing, and means responsive to rotation of said housing for retracting said closure means within said cabinet.

4. In a cabinet having a pivotally mounted housing adapted to selectively extend through or close an opening in a wall of said cabinet, closure means adapted to assume an extended position to partially close off said opening upon rotation of said housing therethrough, spring means for urging said closure means toward said housing, and cam means responsive to rotation of said housing in one direction for permitting said closure means to assume said extended position and responsive to opposite directional rotation of said housing for withdrawing said closure means from said housing.

5. In a cabinet having a pivotally mounted housing adapted to selectively extend through or close an opening in said cabinet, closure means adapted to assume an extended position to partially close off said opening upon rotation of said housing therethrough, spring means normally urging said closure means toward said housing, and cord and pulley means operable in response to rotation of said housing in one direction, to permit said closure means to assume said extended position and operable in response to opposite directional rotation of said housing to withdraw said closure means within said cabinet.

6. In combination, a cabinet having an opening in a wall thereof, a housing pivotally mounted in said cabinet adapted to extend through said opening, slide members slidably mounted in said cabinet, means for urging said slide members into an extended position adjacent said housing, and means responsive to rotation of said housing for permitting said slide members to move outwardly toward said extended position.

7. In combination, a cabinet having an opening in a wall thereof, a housing pivotally mounted in said cabinet adapted to alternately extend through or close said opening, slide members slidably mounted in said cabinet, means for urging said slide members from a retracted position within said cabinet to an extended position parallel to said wall, and means dependent upon the direction of rotation of said housing for alternately permitting outward movement of said slide members to said extended position and for withdrawing said slide members to said retracted position.

8. In combination, a cabinet having an opening in a wall thereof, a housing pivotally mounted in said cabinet adapted to alternately extend through or close said opening, slide members slidably mounted in said cabinet, means for urging said slide members from a retracted position within said cabinet into an extended position in contact with said housing, and means responsive to rotation of said housing for withdrawing said slide members into said retracted position.

9. In combination, a cabinet having an opening in a wall thereof, a housing pivotally mounted in said cabinet adapted to alternately extend through and close said opening, slide members slidably mounted in said cabinet, means for urging said slide members from a retracted position within said cabinet to an extended position in contact with said housing, and means dependent upon the direction of rotation of said housing for alternately permitting outward movement of said slide members to said extended position and for withdrawing said slide members to said retracted position.

10. In combination, a cabinet having an opening in a wall thereof, a housing pivotally mounted in said cabinet adapted to extend through said opening, slide members slidably mounted in said cabinet adapted to close off the space between the side walls of said housing and said opening upon rotation of said housing to a position in which said housing protrudes through said opening, spring means for urging said slide members into an extended position adjacent said housing, cam and cam follower means for retracting one of said slide members within said cabinet and cord and pulley means for retracting the other of said slide members within said cabinet to permit rotation of said housing to a closed position.

11. In combination, a cabinet having an opening in a wall thereof, a housing pivotally mounted in said cabinet adapted to extend through said opening, slide members slidably mounted in said cabinet adapted to close off the space between the side walls of said housing and said opening upon rotation of said housing to a position in which said housing protrudes through said opening, spring means for urging said slide members into an extended position adjacent said housing, and a pulley and cord means operable in response to rotation of said housing for retracting one of said slide members within said cabinet to permit rotation of said housing to a closed position.

12. In combination, a cabinet having an opening in a wall thereof, a housing pivotally mounted in said cabinet adapted to extend through said opening, slide members slidably mounted in said cabinet adapted to close off the space between said side walls of said housing and said opening upon rotation of said housing to extend said housing through said opening, spring means for urging said slide members into an extended position adjacent said housing, and cam and cam follower means operable in response to rotation of said housing for permitting movement of one of said slide members to an extended position adjacent said opening.

13. In combination, a cabinet having an opening in a wall thereof, a housing pivotally mounted in said cabinet adapted to extend through said opening, slide members slidably mounted in said cabinet adapted to close off the space between said side walls of said housing and said opening upon rotation of said housing to extend said housing through said opening, spring means for urging said slide members into an extended position adjacent said housing, and cord and pulley means operable in response to rotation of said housing for permitting movement of one of said slide members to an extended position adjacent said housing.

14. In a cabinet having a picture tube supported in a pivotally mounted housing adapted to selectively extend through or close an opening in a wall of said cabinet, a pair of slide members slidably mounted in said cabinet, means for urging said slide members into contact with the side walls of said housing, and means responsive to rotation of said housing for retracting said slide members from contact with said side walls to permit rotation of said housing to a fully closed position.

15. In a cabinet having a picture tube supported in a pivotally mounted housing adapted to selectively extend through or close an opening in said cabinet, said housing having a side wall of substantially equal width and height as that of said opening, a pair of slide members slidably mounted in said cabinet, means for urging said slide members toward the side walls of said housing, and means responsive to rotation of said housing for retracting said slide members to permit rotation of said housing to a closed position.

16. In a cabinet having a picture reproducing means supported in a pivotally mounted housing adapted to selectively extend through or close an opening in said cabinet, a pair of slide members slidably mounted in said cabinet, spring means normally urging said slide members toward said housing, and means responsive to rotation of said housing for retracting said slide members to permit rotation of said housing.

17. In a cabinet having a picture reproducing means supported in a pivotally mounted housing adapted to selectively extend through or close an opening in a wall of said cabinet, a pair of slide members of substantially equal height to that of said opening slidably mounted in said cabinet, spring means normally urging said slide members into contact with the side walls of said housing, and means responsive to rotation of said housing for retracting said slide members from contact with said side walls to permit rotation of said housing to a closed position.

18. In a cabinet having a picture reproducing means supported in a housing pivotally mounted for rotation about a vertical axis and adapted to selectively extend through or close an opening in a wall of said cabinet, a pair of slide members of substantially equal height to that of said opening slidably mounted in said cabinet adapted to close off the space between the side walls of said housing and the edges of said opening, spring means for normally urging said slide members to an extended position in contact with said side walls, and means responsive to rotation of said housing for retracting said slide members within said cabinet to permit rotation of said housing to a closed position.

19. In a cabinet having a television picture tube of greater length than the depth of said cabinet supported in a pivotally mounted housing adapted to selectively extend through or close an opening in said cabinet, a pair of slide members of substantially equal height to that of said opening adapted to close off the space between the side walls of said housing and said opening slidably mounted in said cabinet, spring means for urging said slide members into an extended position in contact with the side walls of said housing, and means responsive to rotation of said housing for retracting said slide members from contact with said side walls to prevent rotation of said housing to a closed position flush with the front wall of said cabinet.

20. In a cabinet having a picture tube supported in a pivotally mounted housing adapted to selectively extend through or close an opening in a wall of said cabinet, a pair of slide members slidably mounted in said cabinet, resilient means for urging said slide members into contact with the side walls of said housing, and a cam and cam follower means operable in response to rotation of said housing for retracting one of said slide members from contact with said side walls to permit rotation of said housing to a fully closed position.

21. In a cabinet having a picture tube supported in a pivotally mounted housing adapted to selectively extend through or close an opening in a wall of said cabinet, a pair of slide members slidably mounted in said cabinet, spring means for urging said slide members into contact with the side walls of said housing, a cam movable in response to rotation of said housing, and a cam follower operable in response to movement of said cam for retracting one of said slide members from contact with said side walls to permit rotation of said housing to a fully closed position.

22. In a cabinet having a picture reproducing means supported in a pivotally mounted housing adapted to selectively extend through or close an opening in said cabinet, said housing having side walls of substantially equal width and height as that of said opening, a pair of slide members slidably mounted in said cabinet, resilient means for urging said slide members toward the side walls of said housing, a cam and cam follower operable in response to rotation of said housing for retracting one of said slide members, and a cord and pulley apparatus operable in response to rotation of said housing for retracting the other of said slide members to permit rotation of said housing to a closed position.

DANIEL J. SWEENEY.

REFERENCES CITED

The following references are of record in the file of this patent:

UNITED STATES PATENTS

| Number | Name | Date |
|---|---|---|
| 343,041 | Little | June 1, 1886 |
| 873,471 | Viger | Dec. 10, 1907 |
| 1,481,640 | Huppert | Jan. 22, 1924 |
| 2,304,490 | Yoder | Dec. 8, 1942 |
| 2,400,638 | Gayring | May 21, 1946 |
| 2,413,922 | Jensen et al. | Jan. 7, 1947 |
| 2,441,575 | Johnson | May 18, 1948 |